United States Patent Office 2,948,639
Patented Aug. 9, 1960

2,948,639

METHOD OF COATING A SURFACE WITH A COMPOSITION COMPRISING A FURFURYL ALCOHOL RESIN, CELLULOSE, FILLER, AND CATALYST

Claude S. Price, Box 875, League City, Tex.

No Drawing. Filed May 15, 1958, Ser. No. 735,394

2 Claims. (Cl. 117—104)

This application is a continuation-in-part of my earlier application, filed June 29, 1955, Serial No. 518,980, for Paint Composition.

This invention relates to corrosion resistant coatings and it has for its object to provide a sprayable coating resistant to the chemical action of organic and inorganic acids and of alkaline solutions of every concentration, including lyes, detergents, salt solutions, food acids, sulfur fumes and other chemically active agents occurring naturally or produced in the course of industrial production.

It is part of the primary object of the invention to provide a coating which is permanently protective and which exercises such protective action also under conditions of high humidity. Further according to the invention the coating protects also against ultra-violet rays.

It will be understood that while such a coating is highly desirable it is difficult to obtain. The best protective sprayable coatings now available are those prepared by means of synthetic resins, usually designated as plastics, many of which protects against some of the above mentioned chemical influences; but most coatings having a plastic base do not provide a reasonably permanent protection, as they deteriorate in the course of time either by oxidation or by the evaporation of volatile substances they contain, such as plasticizers, or by other slow changes in the composition of the coatings.

Further, most of the sprayable resins are applied by means of a solvent and harden by the evaporation of the solvent thus requiring a long drying period and producing changes in the permeability of the coating by the slow evaporation.

Among the synthetic plastics some show a particularly high resistance against chemicals, but are not sprayable. It is however essential for many applications that a coating should be applied in a simple and inexpensive manner and that it should cover the surfaces to be protected evenly and uniformly even if such surfaces have a complex shape. The best manner of applying a coating is therefore by spraying. Further, it is of great practical importance that a plurality of coatings should be applied within the relatively limited time which is usually available.

It has been found that with respect to a high resistance to corrosion due to chemical agents of all kinds the furan resins offer outstanding qualities. These resins are frequently used as an acid and alkaline proof resin cement or as a bonding medium for chemical stoneware. They are however only available as heavy syrups and are not sprayable. The most important members of this group are the furfuryl alcohol resins, furfural-phenol resins, furfural-acetone resins, furfural-furfuryl alcohol resins, and furfuryl alcohol-formaldehyde resins.

The furfuryl alcohol resins are those extensively used. They are thermo-setting and are produced by converting the furfuryl alcohol (derived by reduction from furfuryl) into a resin by treatment with an acid catalyst in the presence of heat, and by subsequently neutralizing the catalyst.

The invention consists in converting the resins of this group especially furfuryl alcohol resins temporarily into sprayable resins without however impairing their essential property of producing a practically permanent, non-cracking hardened coating protecting fully against chemically strongly active agents, this effect being obtained by hardening the coating by chemical action.

The conventional method of depositing a film by dissolving the film forming material in a solvent, depositing the solution on the object to be protected and evaporating the solvent, is not applicable in this case as the evaporation of a solvent necessary for the film formation would not leave a non-porous film without cracks giving full protection against penetration, as in such a case the protective function against strong chemically active agents would be impaired. Full protection can only be obtained if the hardening of the film is produced by chemical action by means of a hardener which is added to the mixture containing the resin.

In order to produce sprayability of the liquid according to the invention a special mixture is prepared which starts with a pre-polymerized raw material for preparing the polymerized resin and which consists essentially in the pre-polymerized furfuryl alcohol resin base from which the resins are prepared and to mix with it, in addition to the usual filler, cellulose and diluting solvents, mixing these substances most intimately by agitation or otherwise before the acid or acid forming catalyst producing the final polymerization of the resin binder and the resin in its final form is applied.

The substances, as above stated, must be extremely thoroughly mixed by agitation until complete homogenization of the resin and the added filler and solvents has occurred. Should this homogenization be incomplete the bond between the coating and the object upon which it is applied would be unsatisfactory.

After the mixture has been completed a catalyst is added and the main point is that this catalyst, which consists for instance of toluene sulfonic acid, is added to the mixture in a quantity which allows sufficient working time during which spraying may occur. The catalyst starts its action after spraying has been completed and produces resin formation and final polymerization of the coating. The latter has thus a density and impermeability of a furan resin produced by hardening of the pre-polymerized material.

To carry the invention into effect, the raw material which is used is preferably the material known as "Permanite" described in United States Patent 2,768,408 which is assigned to Maurice A. Knight Co., of Akron, Ohio, which is a thermo-setting furfuryl alcohol resin. However the furan resins which have been above mentioned may also be used likewise.

The process starts with a resinous material sometimes referred to as "resin binder" to which a filler, cellulose, benzol, alcohol and xylol and a catalyst is added. The latter may consist as above mentioned of toluene sulfonic acid, sulfamic acid or toluene sulfonyl chloride.

A typical resinous starting material is prepared by heating furfuryl alcohol in the presence of an acid catalyst until the desired viscosity is attained and then subsequently neutralizing the acid catalyst whenever the desired viscosity of the pre-polymerized material has been reached. In addition the product is usually dehydrated in order to remove water formed by condensation during the resinification process.

This initial or preliminary polymerization to obtain the resin binder is for instance described in Patent No. 2,655,491.

This resinous binder material is a base material of furan resin cement. Upon the addition of a catalyst it is transformed into a solid body. The process of mixing with the above mentioned materials and of so regulating the quantity of the catalyst, operating at a given temperature that the reaction is completed only after a predetermined interval permits the product to be converted during this short interval into a sprayable substance and therefore permits the production of a sprayable coating which produces a thin rapidly hardening film, so that a second coating can be applied within a very short time. Although the film is thin it is continuous without pores or cracks and extremely dense and resistant so that even small gas or liquid particles cannot easily penetrate it. The resistance of the coating against chemicals, as above explained, is higher than that of almost all known coatings.

*Example*

To prepare a sprayable coating first a furfuryl alcohol resin base of the desired viscosity is prepared in the manner indicated above and also described in the patent above cited and then the following mixture is prepared.

18 parts 250 cps. resin binder
14 parts coke flour (100 mesh) (for black coating)
1 part cellulose
3 parts benzol
76 parts alcohol
20 parts xylol
All parts are by weight Toluene sulfonic acid is then added depending on "working time" and temperature.

Before the catalyst is added the mixture is thoroughly homogenized by agitation which is essential for obtaining an adhering coating.

The coke flour is only used if a black color of the coating is desired. For a white color zinc dust is used and for other colors other pigmenting fillers are used. Such color bases are well known in the art. The filler consisting of coke flour may also be replaced by other fillers such as sand, silica flour, porcelain dust, crushed brick, asbestos fiber, glass fiber, plastic fiber, such as polyamide or acrylonitrile fibers or by insoluble salts such as barium sulfate.

Any alcoholic solvent may be used. Methyl, ethyl, and isopropyl alcohol are preferred. Instead of xylol other hydrocarbon solvents like toluol may be used.

The quantity of toluene sulfonic acid is selected by the user in accordance with temperature and the delay or "working time" which is desired and which is the time interval between the addition of the catalyst and the beginning of the hardening of the coating. During this "working time" the coating must have been completed. For instance at a temperature of the mixture of 80° to 90° F. for one gallon (160 cc.) of the above mixture 40 cc. of the catalyst are added, this permits a "working time" of 20 to 30 minutes.

If the mixture before the addition of the catalyst is cooled below room temperature to 50° F. and the same quantity of the catalyst is added the working time is about 2 to 3 hours. Reduced quantities of the catalyst and reduced temperatures produce a lengthening of the working time. Cooling may be effected down to a temperature of 40° F. and lower.

The working time increases approximately in proportion to the quantity, but increases more rapidly upon lowering of the temperature.

It is to be noted that what is prepared is not a diluted cement but is a mixture of a special type, forming the base of the coating and rendered sprayable during the working time.

On account of the fact that the hardening occurs in a relatively short time a second coating must be provided within the time usually available for the production of the coating.

There is no scum formation on the surface of the coating which has therefore an attractive appearance. The coating can be applied on metal which must however be thoroughly cleaned and must be free from grease, oil, scale and rust. Preferably steel is cleaned by sand blast before applying the coating. The coating will firmly adhere and will form a complete protection. Concrete surfaces, bricks, etc. may also be coated after having been cleaned, so that they are dry and free from grease, oil and dirt. Also wood may be coated and the coating can be applied directly to the wood surface.

It will be thus seen that the invention provides the possibility of applying chemically resistant sprayable coatings to all types of structures which without spraying could not be provided with such a coating. For instance standing structures, bridges, petroleum and gas storage tanks, oil distribution stations, buildings, railway equipment, ships and other objects may be protected in the manner indicated. Gasoline pumps, transformer tanks and a variety of other industrial equipment which can only be provided with a coating by spraying can in this way be protected.

It will be clear that non-essential changes may be made or additional matters may be incorporated without in any way departing from the essence of the invention as defined in the annexed claims.

Having described the invention what is claimed is:

1. In a method of producing a coating of a furan resin on the surface of an object to be protected, wherein a composition consisting essentially of 18 parts of a partially polymerized furfuryl alcohol resin; 14 parts of at least one filler selected from the group consisting of coke flour, zinc dust, barium sulfate, silica flour, porcelain dust, crushed brick, asbestos fiber, glass fibers, and fibers of synthetic resinous plastics; 1 part of cellulose; 3 parts of benzol; 76 parts of alcohol and 20 parts of xylol, all proportions being expressed in parts by weight, is formed into a homogeneous mixture and a catalyst from the group consisting of toluene sulfonic acid, sulfamic acid and toluene sulfonyl chloride is added to the resulting homogeneous hardenable coating composition, the improvements which comprise: cooling the composition to below room temperature, and to below about 50° F. before the addition of the catalyst thereto, whereby the interval of time before reaction in said composition is increased as compared with the interval of time before reaction in an uncooled mixture, of similar composition; and in applying said cooled catalyst-containing mixture onto the surface to be coated in the interval before reaction, polymerization and hardening of the furfuryl alcohol resin have occurred, whereby the setting, hardening and polymerization of said resin take place in the composition after it has been applied as a coating.

2. In a method of producing a coating of a furan resin on the surface of an object to be protected, wherein a composition consisting essentially of 18 parts of a partially polymerized furfuryl alcohol resin; 14 parts of at least one filler selected from the group consisting of coke flour, zinc dust, barium sulfate, silica flour, porcelain dust, crushed brick, asbestos fiber, glass fibers, and fibers of synthetic resinous plastics; 1 part of cellulose; 3 parts of benzol; 76 parts of alcohol and 20 parts of xylol, all proportions being expressed in parts by weight, is formed into a homogeneous mixture and a catalyst from the group consisting of toluene sulfonic acid, sulfamic acid and toluene sulfonyl chloride is added to the resulting homogeneous hardenable coating composition, the improvement which comprise: cooling the composition to below room temperature, and to below about 50° F. before the addition of the catalyst thereto, whereby the interval of time before reaction in said composition is increased as compared with the interval of time before reaction in an uncooled mixture, of similar composition; and in spraying said cooled catalyst-containing mixture onto the surface to be coated in the interval before reaction, polymerization and hardening of the furfuryl alcohol resin have occurred, whereby the setting, hardening and polymerization of said resin take place in the composition after it has been sprayed as a coating.

References Cited in the file of this patent

UNITED STATES PATENTS

| | | |
|---|---|---|
| 2,267,830 | Lewis | Dec. 30, 1941 |
| 2,345,966 | Fielder et al. | Apr. 4, 1944 |
| 2,612,445 | Spence | Sept. 30, 1952 |
| 2,655,491 | Edmunds et al. | Oct. 13, 1953 |
| 2,813,846 | Farber et al. | Nov. 19, 1957 |